(12) United States Patent
Sakurai

(10) Patent No.: US 11,104,251 B2
(45) Date of Patent: Aug. 31, 2021

(54) RECLINING APPARATUS

(71) Applicant: SHIROKI CORPORATION, Fujisawa (JP)

(72) Inventor: Noriyuki Sakurai, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 16/895,400

(22) Filed: Jun. 8, 2020

(65) Prior Publication Data

US 2020/0398709 A1    Dec. 24, 2020

(30) Foreign Application Priority Data

Jun. 24, 2019 (JP) .............................. JP2019-116169

(51) Int. Cl.
*B60N 2/235* (2006.01)
*A47C 1/025* (2006.01)
*B60N 2/22* (2006.01)
*B60N 2/225* (2006.01)

(52) U.S. Cl.
CPC ............ *B60N 2/2362* (2015.04); *A47C 1/025* (2013.01); *B60N 2/2227* (2013.01); *B60N 2/2254* (2013.01)

(58) Field of Classification Search
CPC .. B60N 2/2227; B60N 2/2254; B60N 2/2362; A47C 1/025

USPC .................................................. 297/374, 362
See application file for complete search history.

(56) References Cited

U.S. PATENT DOCUMENTS

| 8,460,145 | B2 * | 6/2013 | Mitsuhashi | .......... | B60N 2/2252 |
| | | | | | 475/162 |
| 10,941,837 | B2 * | 3/2021 | Sakurai | ..................... | A47C 7/40 |
| 2017/0327009 | A1 * | 11/2017 | Kim | ..................... | B60N 2/2213 |
| 2018/0134185 | A1 * | 5/2018 | Sakurai | ................ | B60N 2/2252 |
| 2020/0331367 | A1 * | 10/2020 | Schmitz | ............... | B60N 2/2213 |

FOREIGN PATENT DOCUMENTS

| DE | 102011016656 B3 * | 8/2012 | ........... B60N 2/2252 |
| JP | 2011125425 A | 6/2011 | |

* cited by examiner

*Primary Examiner* — Milton Nelson, Jr.
(74) *Attorney, Agent, or Firm* — Buchanan Ingersoll & Rooney PC

(57) ABSTRACT

A reclining apparatus includes an inner tooth member, an outer tooth member, a pair of wedges, an urging member that urges the pair of wedges, and a striker that moves the pair of wedges. Each of the pair of wedges includes a wedge body, a first end portion, a second end portion, and a protrusion. The striker includes a pair of pressing portions that presses the protrusion. Each of the pressing portions includes a pressing site having a pressing surface that presses the protrusion, and a movement restraining site that is provided on an opposite side of the pressing surface in the pressing site and restrains the wedge from moving.

10 Claims, 14 Drawing Sheets

RECLINING APPARATUS

CROSS-REFERENCE TO RELATED APPLICATION

This application claims priority from Japanese Patent Application No. 2019-116169 filed with the Japan Patent Office on Jun. 24, 2019, the entire content of which is hereby incorporated by reference.

BACKGROUND

1. Technical Field

One aspect of the present disclosure relates to a reclining apparatus.

2. Related Art

As an example of the reclining apparatus provided in a seat of a vehicle, a reclining apparatus described in JP-A-2011-125425 is known.

The reclining apparatus includes an inner tooth member provided with inner teeth, an outer tooth member provided with outer teeth, a pair of wedges, and an operating member for operating the pair of wedges. The pair of wedges is arranged in a gap between the inner tooth member and the outer tooth member in a state in which the inner teeth and the outer teeth are meshed with each other. The wedge moves in a circumferential direction of a circle about a rotation axis of the inner tooth member or the outer tooth member. Note that in JP-A-2011-125425, the wedge is called a wedge member.

As illustrated in FIG. 8 of JP-A-2011-125425, the wedge includes a wedge body portion and a protrusion. The protrusion is provided on the wedge body so as to protrude in the rotation axis direction. The protrusion has a pressed surface and a pulled surface. An operating portion has a protuberance extending in a radial direction with respect to the rotation axis. The protuberance rotates in the circumferential direction in response to rotation of the operating portion about the rotation axis. The protuberance is formed to rotationally move to press the pressed surface of the protrusion provided on the wedge body or pull the pulled surface of the protrusion.

SUMMARY

A reclining apparatus includes: an inner tooth member including inner teeth arranged along an inner circumferential surface about a first central axis, and a first circumferential surface about the first central axis; an outer tooth member including outer teeth arranged along an outer circumferential surface about a second central axis, and a second circumferential surface configured to face the first circumferential surface about the second central axis; a pair of wedges arranged in a wedge accommodation space between the first circumferential surface and the second circumferential surface; an urging member that urges the pair of wedges toward a narrowed portion of the wedge accommodation space; and a striker that moves the pair of wedges. Each of the pair of wedges includes a wedge body, a first end portion provided at one end of the wedge body, a second end portion provided at an end opposite to the first end portion in the wedge body, and a protrusion protruding along the first central axis from an end surface facing a direction along the first central axis. The striker includes a pair of pressing portions that presses the protrusion. Each of the pressing portions includes a pressing site having a pressing surface that presses the protrusion, and a movement restraining site that is provided on an opposite side of the pressing surface in the pressing site and restrains the wedge from moving in the direction along the first central axis.

BRIEF DESCRIPTION OF THE DRAWINGS

FIG. 2 is a plan view of a reclining apparatus as seen through.

DETAILED DESCRIPTION

Figure 1:
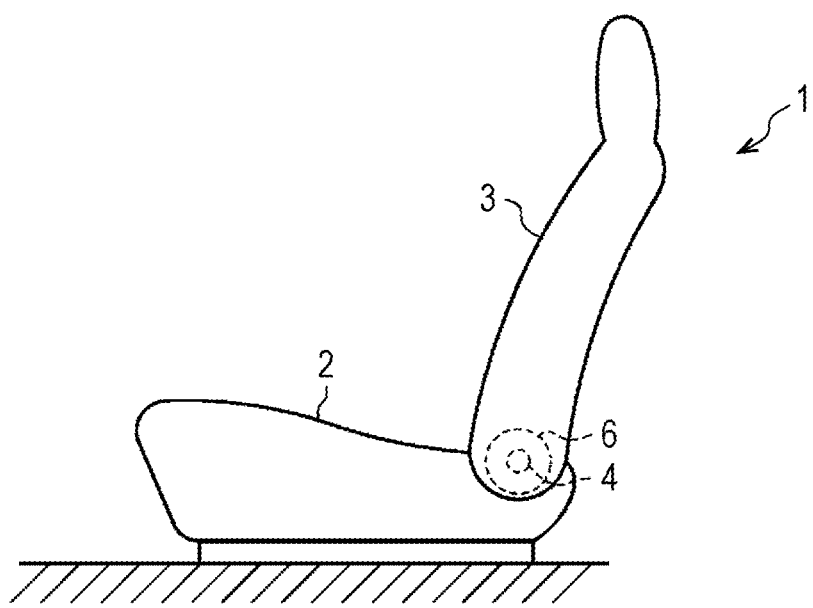
FIG. 1 is a side view of a seat.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 8:
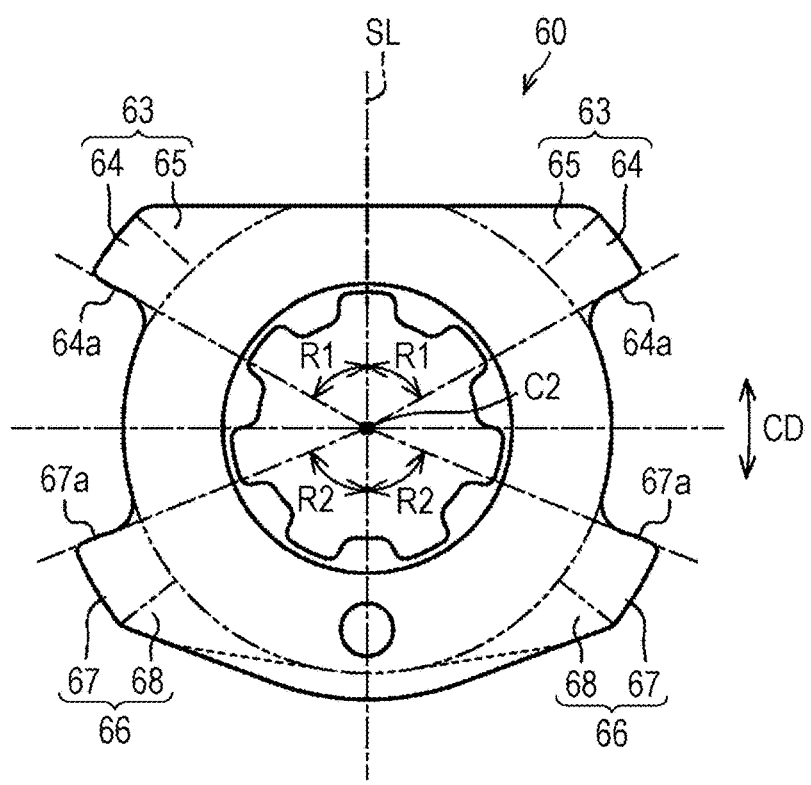
FIG. 8 is a plan view of the striker.

In the wedge shown in FIG. 8 of JP-A-2011-125425, the protrusion is disposed in the rotation axis direction with respect to the wedge body. Therefore, when the protuberance of the operating portion contacts the protrusion of the wedge to apply a force to the wedge in the circumferential direction about the rotation axis, a part of the force acts in the circumferential direction about a line perpendicular to the rotation axis. As a result, when the force is applied to the wedge from the protuberance of the operating portion, a tip portion and a base end portion of the wedge sway in the rotation axis direction, and thus the wedge may not operate smoothly. Therefore, one object of the present disclosure is to provide a reclining apparatus in which the wedge operates smoothly.

(1) A reclining apparatus according to one aspect of the present disclosure (the present reclining apparatus) includes: an inner tooth member including inner teeth arranged along an inner circumferential surface about a first central axis, and a first circumferential surface about the first central axis; an outer tooth member including outer teeth arranged along an outer circumferential surface about a second central axis, and a second circumferential surface configured to face the first circumferential surface about the second central axis; a pair of wedges arranged in a wedge accommodation space between the first circumferential surface and the second circumferential surface; an urging member that urges the pair of wedges toward a narrowed portion of the wedge accommodation space; and a striker that moves the pair of wedges. Each of the pair of wedges includes a wedge body, a first end portion provided at one end of the wedge body, a second end portion provided at an end opposite to the first end portion in the wedge body, and a protrusion protruding along the first central axis from an end surface facing a direction along the first central axis. The striker includes a pair of pressing portions that presses the protrusion. Each of the pressing portions includes a pressing site having a pressing surface that presses the protrusion, and a movement restraining site that is provided on an opposite side of the pressing surface in the pressing site and restrains the wedge from moving in the direction along the first central axis. With this configuration, displacement of the second end portion of the wedge in the direction along the first central axis is restrained, so that the wedge moves smoothly.

(2) In the present reclining apparatus, the movement restraining sites of the pair of pressing portions may be connected to each other.

With this configuration, the movement restraining sites are connected to each other, so that strength of each movement restraining site is increased. As a result, deformation of the pressing portion is suppressed.

(3) In the present reclining apparatus, the pressing site of the pressing portion may have a tip portion and a root portion, the root portion is connected to a flange portion of the striker, and the movement restraining site of the pressing portion may be configured such that at least a part of the movement restraining site extends from the root portion. With this configuration, the striker can be downsized.

(4) In the present reclining apparatus, the pressing site of the pressing portion may have a connecting portion connected to a flange portion of the striker, and the movement restraining site may be configured such that at least a part of the movement restraining site extends from the connecting portion. With this configuration, at least a part of the movement restraining site can be separated from the pressing site. Therefore, the striker can be reduced in weight.

(5) In the present reclining apparatus, the striker may include a first pressing portion that is the pressing portion, and further may include a pair of second pressing portions that presses the first end portion of the wedge, and each of the second pressing portions may include a pressing site having a pressing surface that presses the first end portion, and a reinforcing site that is provided on the opposite side of the pressing surface in the pressing site and reinforces the second pressing portion. With this configuration, the second pressing portion is reinforced by the reinforcing site. This suppresses the deformation of the second pressing portion.

(6) In the present reclining apparatus, the reinforcing sites of the pair of second pressing portions may be configured to be connected to each other.

With this configuration, the reinforcing sites are connected to each other, so that the strength of each reinforcing site is increased. As a result, the deformation of the second pressing portion is suppressed.

(7) In the present reclining apparatus, when the striker is disposed in a reverse direction with respect to the pair of wedges, the first pressing portion and the second pressing portion may be configured such that the first pressing portion operates as the second pressing portion and the second pressing portion operates as the first pressing portion.

With this configuration, the striker can be disposed in the reverse direction in the wedge accommodation space. This allows the striker to take two different directions in assembly. Therefore, an assembly efficiency is improved.

(8) In the present reclining apparatus, the striker may be disposed in a first direction in which the pressing surface of the first pressing portion is located at a position facing a second pressed surface of the protrusion of the wedge, the pressing surface of the second pressing portion may be configured such that the pressing surface of the second pressing portion when the striker is disposed in a second direction opposite to the first direction is located at a position different from a position of the pressing surface of the first pressing portion when the striker is disposed in the first direction, and the movement restraining site provided in the first pressing portion is formed in a shape different from that of the reinforcing site provided in the second pressing portion.

Due to dimensional tolerances of the inner tooth member, the outer tooth member, and the wedge, a position of the wedge disposed in the wedge accommodation space is different in each reclining apparatus. With the striker having the above configuration, when the striker is disposed in the reverse direction, the second pressing portion is located at a position different from the position of the first pressing portion, and the second pressing portion operates as the first pressing portion. In this way, by changing the direction of the striker with respect to the position of the wedge, it is possible to adjust a distance between the protrusion of the wedge and the first pressing portion of the striker. Since the distance can be adjusted in this way, an operation delay of the wedge with respect to an operation of the striker can be adjusted within an appropriate range.

(9) In the present reclining apparatus, the pressing site of the second pressing portion may have a tip portion and a root portion, the root portion is connected to a flange portion of the striker, and the reinforcing site may be configured such that at least a part of the reinforcing site extends from the root portion. With this configuration, the striker can be downsized.

(10) In the present reclining apparatus, the pressing site of the second pressing portion may have a connecting portion connected to a flange portion of the striker, and the reinforcing site may be configured such that at least a part of the reinforcing site extends from the connecting portion. With this configuration, at least a part of the reinforcing site can be separated from the pressing site. Therefore, the striker can be reduced in weight.

According to this reclining apparatus, the wedge operates smoothly.

The reclining apparatus will be described with reference to FIGS. 1 to 12.

As illustrated in FIG. 1, a reclining apparatus 6 is provided, for example, on a seat 1 provided on a vehicle floor.

The seat 1 includes a seat cushion 2 that forms a seat surface and a seat back 3 that forms a backrest. The seat back 3 is rotatably attached to the seat cushion 2. The seat cushion 2 and the seat back 3 have a portion overlapping each other when viewed from a side surface. The reclining apparatus 6 is provided at a portion where the seat cushion 2 and the seat back 3 overlap each other. The reclining apparatus 6 adjusts an inclination angle of the seat back 3 with respect to the seat cushion 2 and fixes the seat back 3 to the seat cushion 2.

A shaft 4 penetrates a central portion of the reclining apparatus 6. The shaft 4 is coupled to a striker 60 (see FIG. 3, described below) provided in the reclining apparatus 6. The shaft 4 rotates in a forward direction or a reverse direction by power of a motor. The striker 60 rotates as the shaft 4 rotates. Rotation of the striker 60 releases engagement between an inner tooth member 10 and an outer tooth member 20 shown in FIG. 3 and described below. Thus, the seat back 3 shown in FIG. 1 rotates forward or backward. In this way, the seat back 3 is tilted with respect to the seat cushion 2.

Figure 2:
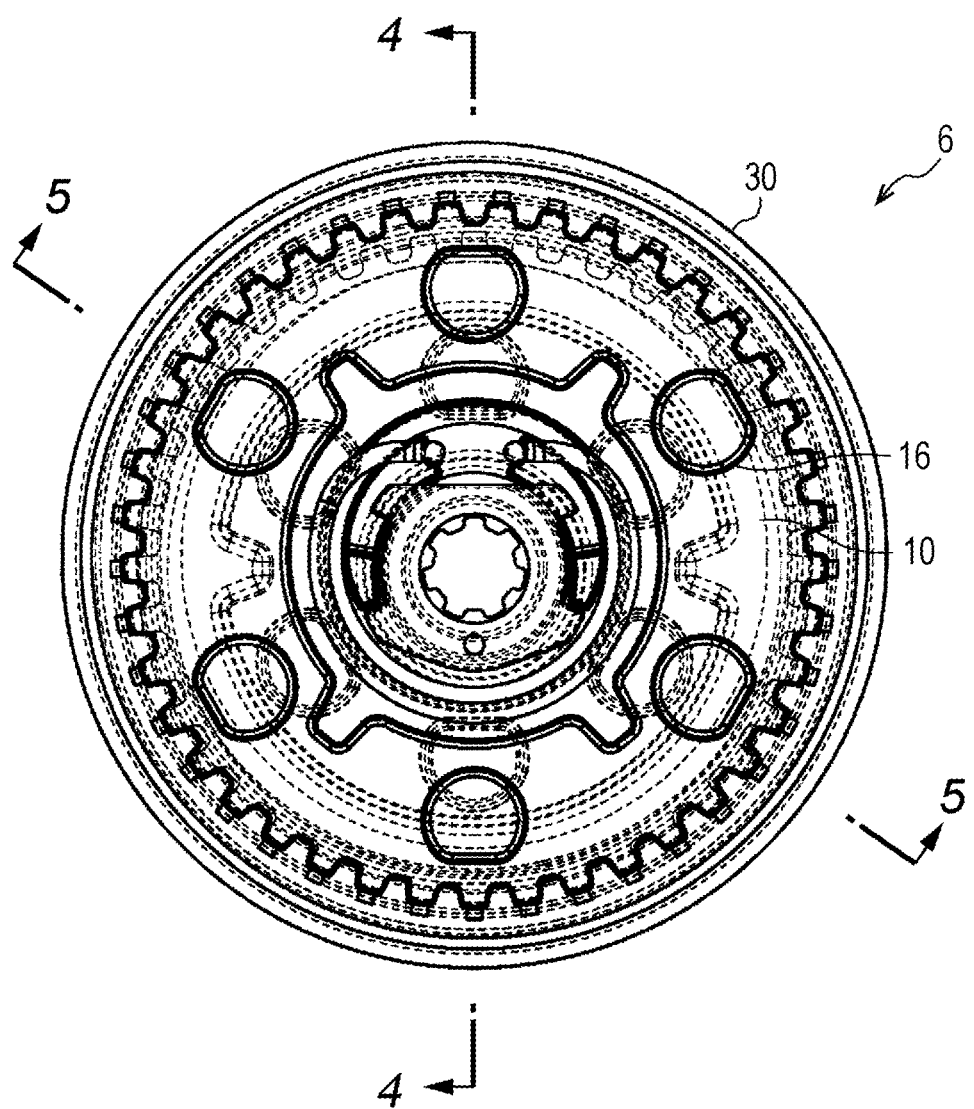
Figure 3:
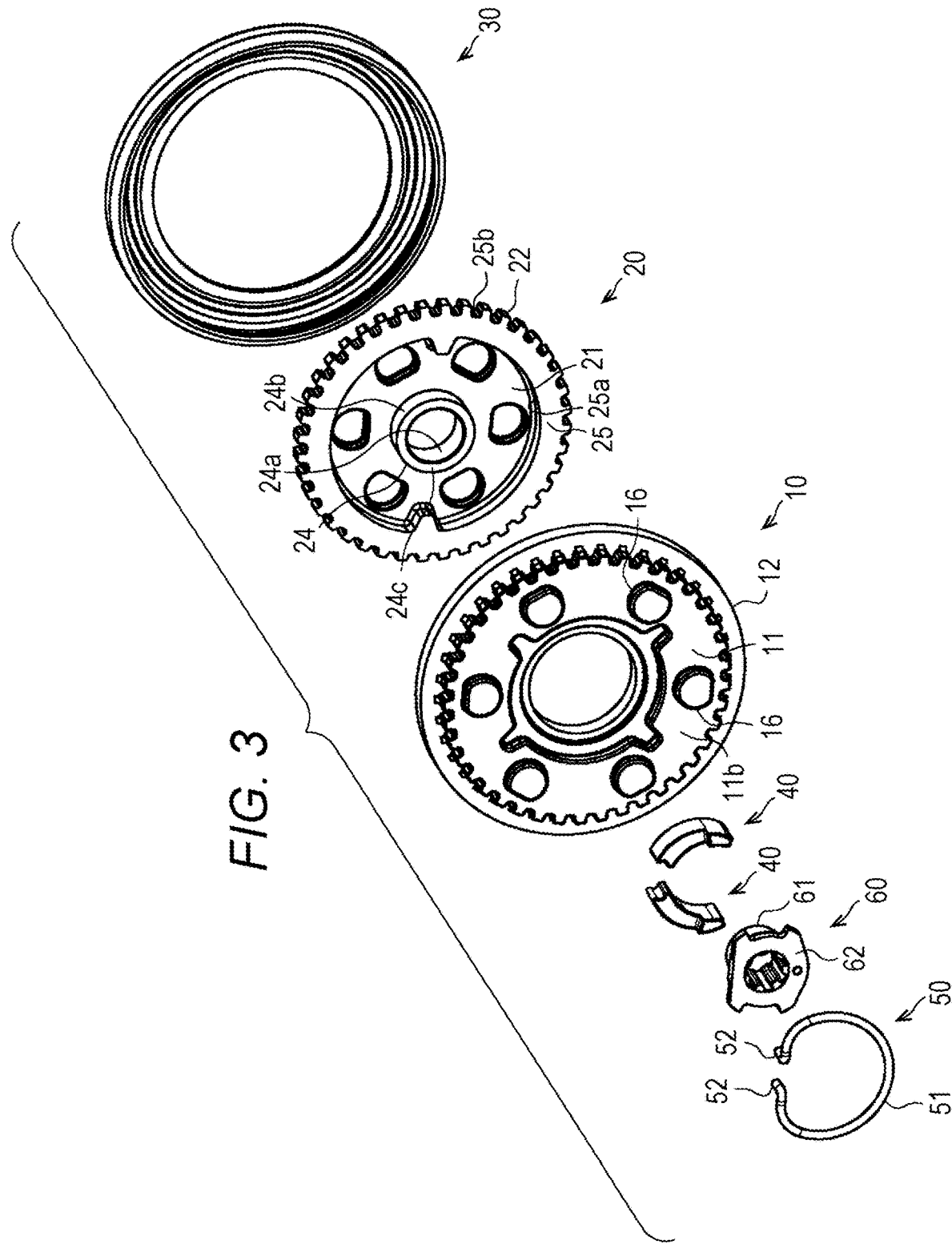
FIG. 3 is an exploded perspective view of the reclining apparatus.

FIG. 2 is a plan view of the reclining apparatus 6 as seen through. FIG. 3 is an exploded perspective view of the reclining apparatus 6. As illustrated in FIGS. 2 and 3, the reclining apparatus 6 includes the inner tooth member 10, the outer tooth member 20, a pair of wedges 40, an urging member 50, and the striker 60. One of the inner tooth member 10 and the outer tooth member 20 is attached to the seat cushion 2. The other of the inner tooth member 10 and the outer tooth member 20 is attached to the seat back 3. In the present embodiment, the inner tooth member 10 is attached to the seat cushion 2. The outer tooth member 20 is attached to the seat back 3. Preferably, the reclining apparatus 6 further includes a holding member 30 that holds the inner tooth member 10 and the outer tooth member 20.

The inner tooth member 10 will be described with reference to FIGS. 3 to 5. The inner tooth member 10 includes inner teeth 13, and a first circumferential surface 14 about a first central axis C1.

In one example, the inner tooth member 10 includes a base portion 11 and a circumferential portion 12 provided along an outer circumference of the base portion 11. The circumferential portion 12 has an inner circumferential surface 12a about the first central axis C1 and an outer circumferential surface 12b about the first central axis C1. The inner teeth 13 are arranged along the inner circumferential surface 12a of the circumferential portion 12. The base portion 11 has an inner surface 11a facing the outer tooth member 20 and an outer surface 11b on the opposite side (back side) of the inner surface 11a.

The outer surface 11b of the inner tooth member 10 is provided with a plurality of coupling portions 16 that are coupled to the seat cushion 2. The coupling portion 16 is preferably fixed to a frame of the seat cushion 2 by welding. The coupling portion 16 is formed to protrude from the outer surface 11b. The first circumferential surface 14 of the inner tooth member 10 is provided on the base portion 11. In the present embodiment, the first circumferential surface 14 is formed as an inner circumferential surface of a circular through-hole 15 provided in the base portion 11.

The outer tooth member 20 will be described with reference to FIGS. 3 to 5. The outer tooth member 20 includes outer teeth 22 and a second circumferential surface 23. In one example, the outer tooth member 20 includes a base portion 21 and a circumferential portion 25 provided along an outer circumference of the base portion 21. The circumferential portion 25 has an inner circumferential surface 25a about a second central axis C2 and an outer circumferential surface 25b about the second central axis C2. Diameter of the outer circumferential surface 25b of the circumferential portion 25 is smaller than that of the inner circumferential surface 12a of the circumferential portion 12 of the inner tooth member 10 (see FIG. 5). The outer teeth 22 are provided on the outer circumferential surface 25b of the circumferential portion 25. The outer teeth 22 are arranged along the outer circumferential surface 25b about the second central axis C2. The number of teeth of the outer teeth 22 is smaller than that of inner teeth 13. For example, the number of teeth of the outer teeth 22 is set to be one less than that of the inner teeth 13. The base portion 21 has an inner surface 21a facing the inner tooth member 10 and an outer surface 21b on the opposite side (back side) of the inner surface 21a.

Figure 4:
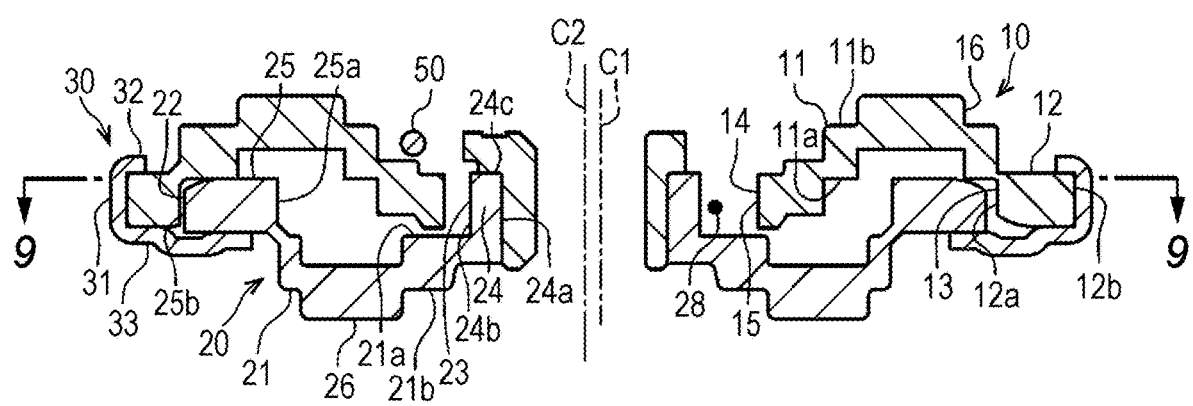
FIG. 4 is a cross-sectional view of the reclining apparatus taken along a line 4-4 in FIG. 2.
Figure 5:
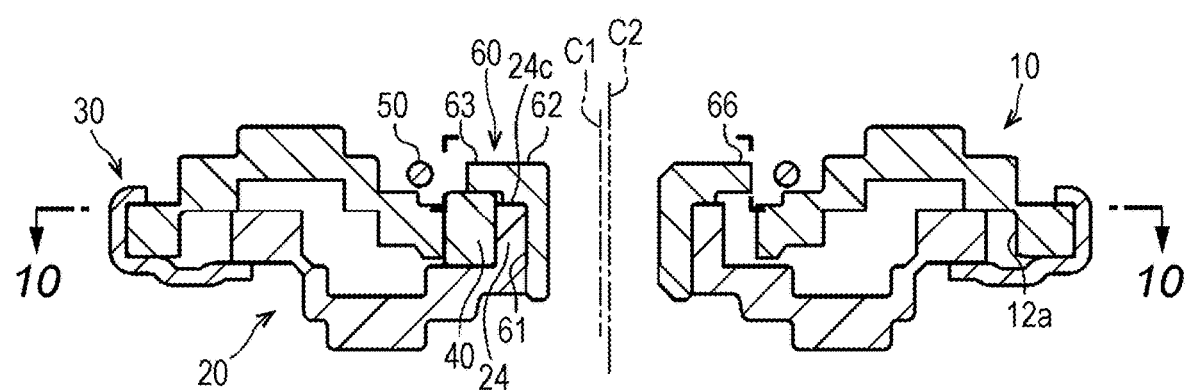
FIG. 5 is a cross-sectional view of the reclining apparatus taken along a line 5-5 of FIG. 2.

As illustrated in FIG. 4, the outer surface 21b of the outer tooth member 20 is provided with a plurality of coupling portions 26 that are coupled to the seat back 3. The coupling portions 26 are preferably fixed to a frame of the seat back 3 by welding. The coupling portion 26 is formed to protrude from the outer surface 21b.

As illustrated in FIG. 4, the second circumferential surface 23 of the outer tooth member 20 is provided on the base portion 21. The second circumferential surface 23 is formed to face the first circumferential surface 14 about the second central axis C2.

A specific example of the second circumferential surface 23 will be described with reference to FIG. 4. A cylindrical portion 24 is provided on the base portion 21. The cylindrical portion 24 has an inner circumferential surface 24a and an outer circumferential surface 24b about the second central axis C2. The cylindrical portion 24 protrudes from the inner surface 21a of the base portion 21. The second circumferential surface 23 of the outer tooth member 20 is formed as the outer circumferential surface 24b of the cylindrical portion 24. The diameter of the second circumferential surface 23 is smaller than that of the first circumferential surface 14 of the inner tooth member 10. The cylindrical portion 24 including the outer circumferential surface 24b forming the second circumferential surface 23 is inserted into the through-hole 15 having the first circumferential surface 14 so that the second circumferential surface 23 faces the first circumferential surface 14.

Figure 9:
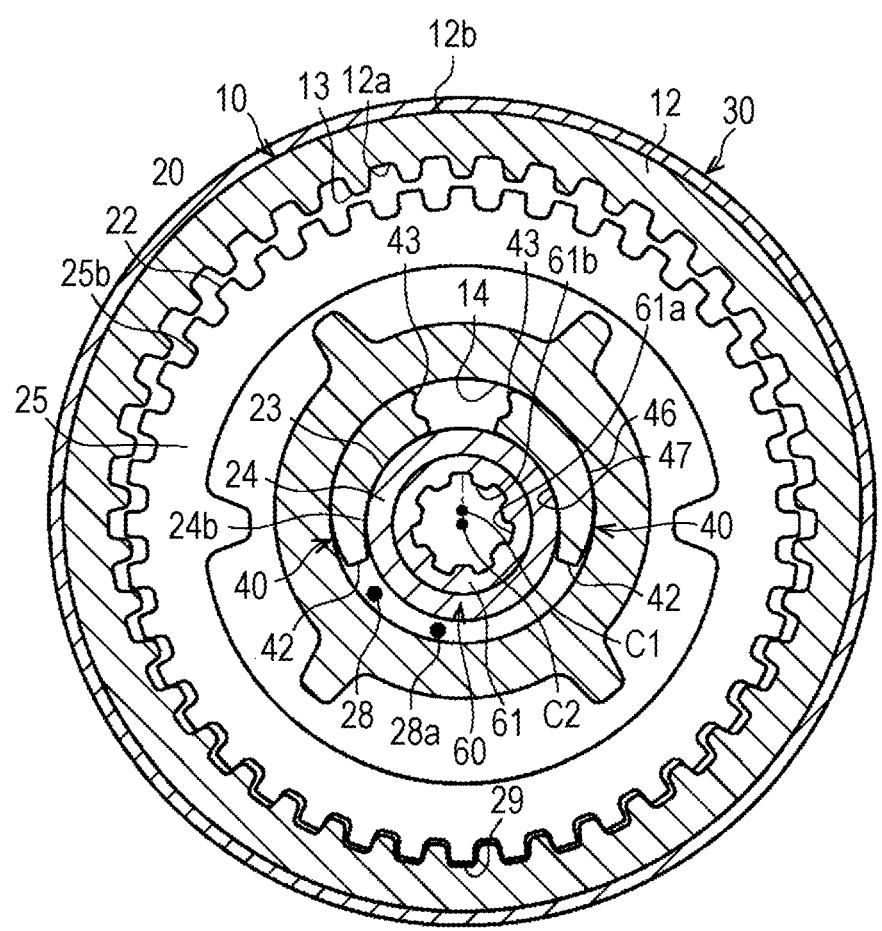
FIG. 9 is a cross-sectional view of the reclining apparatus taken along a line 9-9 in FIG. 4.

A wedge accommodation space 28 accommodating the pair of wedges 40 is formed between the first circumferential surface 14 and the second circumferential surface 23 (see FIG. 9). In the present embodiment, the wedge accommodation space 28 is formed in a ring shape. The wedge accommodation space 28 may be formed to have a shape including two arcs formed by a part of the second circumferential surface 23 contacting the first circumferential surface 14.

As illustrated in FIG. 9, the second central axis C2 of the outer tooth member 20 is placed in a position eccentric from the first central axis C1 of the inner tooth member 10 by accommodating the pair of wedges 40 in the wedge accommodation space 28. Thus, the outer teeth 22 of the outer tooth member 20 mesh with the inner teeth 13 of the inner tooth member 10. The outer teeth 22 of the outer tooth member 20 and the inner teeth 13 of the inner tooth member 10 mesh with each other at a meshing portion 29. The meshing portion 29 moves as the outer tooth member 20 eccentrically rotates with respect to the inner tooth member 10. The meshing portion 29 is a portion including the inner teeth 13 and the outer teeth 22, which mesh with each other. The outer tooth member 20 moves along the inner circumferential surface 12a of the inner tooth member 10 by rotating around the second central axis C2 while meshing with the inner tooth member 10. Thus, the outer tooth member 20 eccentrically rotates with respect to the first central axis C1 of the inner tooth member 10. Such a mechanism including the inner tooth member 10 and the outer tooth member 20 is also referred to as a Taumel mechanism.

The holding member 30 holds the inner tooth member 10 and the outer tooth member 20 so that one of the inner tooth member 10 and the outer tooth member 20 is rotatable with respect to the other, and the outer tooth member 20 is disposed in a predetermined position range with respect to the inner tooth member 10 in a direction along the first central axis C1.

As illustrated in FIG. 4, the holding member 30 includes a circumferential portion 31, a first flange portion 32, and a second flange portion 33. The circumferential portion 31 contacts the outer circumferential surface 12b of the inner tooth member 10. The first flange portion 32 contacts the inner tooth member 10. The second flange portion 33 contacts the outer tooth member 20.

Figure 6:
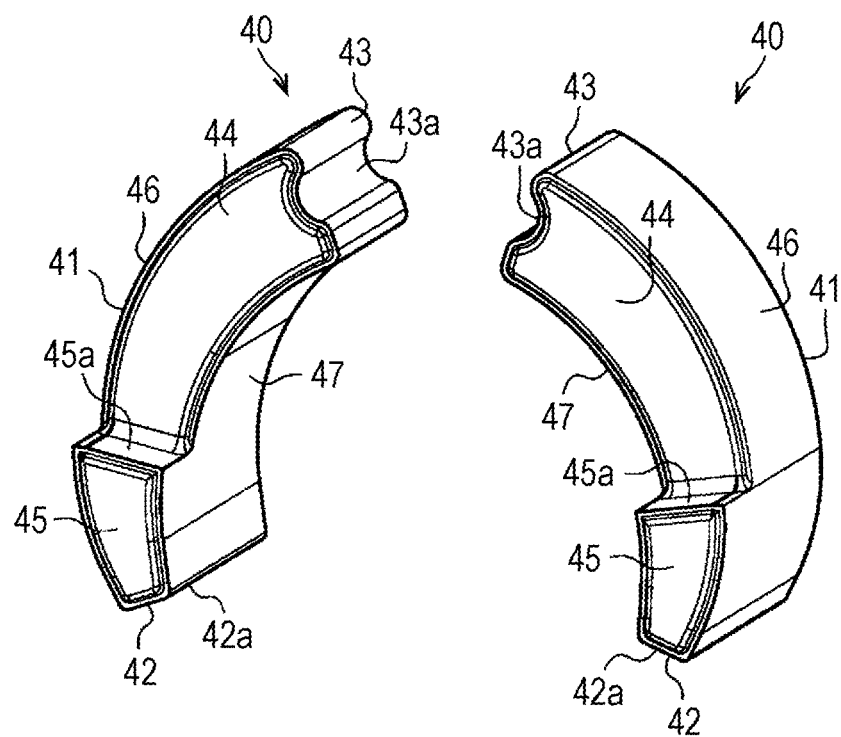
FIG. 6 is a perspective view of a wedge.

The wedge 40 will be described with reference to FIG. 6. The pair of wedges 40 is arranged in the wedge accommodation space 28 between the first circumferential surface 14 and the second circumferential surface 23.

Each of the pair of wedges 40 has a wedge body portion 41, a first end portion 42 provided at one end of the wedge body portion 41, a second end portion 43 provided on an end opposite to the first end portion 42 in the wedge body portion 41, and a protrusion 45.

The first end portion 42 is provided with a first pressed surface 42a that is pressed by a second pressing portion 66 of the striker 60. The second end portion 43 is provided with an engaging portion 43a with which an end portion 52 of the urging member 50 is engaged.

The wedge 40 has a first contact surface 46 and a second contact surface 47. The first contact surface 46 contacts the first circumferential surface 14 of the inner tooth member 10. The second contact surface 47 contacts the second circumferential surface 23 of the outer tooth member 20.

The wedge 40 is formed so that a width in a radial direction is reduced from the second end portion 43 to the first end portion 42. Here, the radial direction of the wedge 40 is a direction perpendicular to the second central axis C2 of the wedge 40 disposed in the wedge accommodation space 28. Specifically, the wedge 40 is formed so that the width between the first contact surface 46 and the second contact surface 47 is reduced toward the first end portion 42. The first contact surface 46 is curved along the first circumferential surface 14 of the inner tooth member 10.

The first contact surface 46 is formed such that in a state in which the wedge 40 is disposed in the wedge accommodation space 28 and is urged by the urging member 50, at least one position of the first contact surface 46 contacts the first circumferential surface 14. The second contact surface 47 is formed such that in a state in which the wedge 40 is disposed in the wedge accommodation space 28 and is urged by the urging member 50, at least one position of the second contact surface 47 contacts the second circumferential surface 23.

The protrusion 45 protrudes along the first central axis C1 from an end surface 44 facing a direction along the first central axis C1.

The protrusion 45 is provided on the first end portion 42 side of the wedge 40. The end surface 44 is provided on the second end portion 43 side of the wedge 40. The end surface 44 is formed so that first pressing portions 63 are in sliding contact with the end surface 44. The protrusion 45 has a second pressed surface 45a that is pressed by the first pressing portions 63 of the striker 60. The second pressed surface 45a is provided on the opposite side of the first pressed surface 42a in the protrusion 45.

As illustrated in FIG. 9, the pair of wedges 40 is arranged in the wedge accommodation space 28 such that the first end portions 42 face a narrowed portion 28a. The first end portions 42 of the pair of wedges 40 are arranged to sandwich the narrowed portion 28a. The second end portions 43 of the pair of wedges 40 are arranged to be separated from each other.

The urging member 50 urges the pair of wedges 40 so that the pair of wedges 40 faces the narrowed portion 28a of the wedge accommodation space 28. The urging member 50 is formed of a spring. In one example, the urging member 50 is formed of a spring including an arc portion 51. The end portion 52 of the arc portion 51 is hooked on the engaging portion 43a of the second end portion 43 of the wedge 40. The urging member 50 engages with the pair of wedges 40 in a deformed state in which stress is accumulated. The pair of wedges 40 is urged so that by an urging force of the urging member 50, the second end portions 43 of the pair of wedges 40 are separated from each other and the first end portions 42 of the pair of wedges 40 both approach the narrowed portion 28a.

The striker 60 will be described with reference to FIGS. 7 to 9.

The striker 60 moves the pair of wedges 40. The striker 60 is rotatably attached to the inner tooth member 10 or the outer tooth member 20. In the present embodiment, the striker 60 is attached to the outer tooth member 20 so as to be rotatable about the second central axis C2 of the outer tooth member 20.

Figure 7:
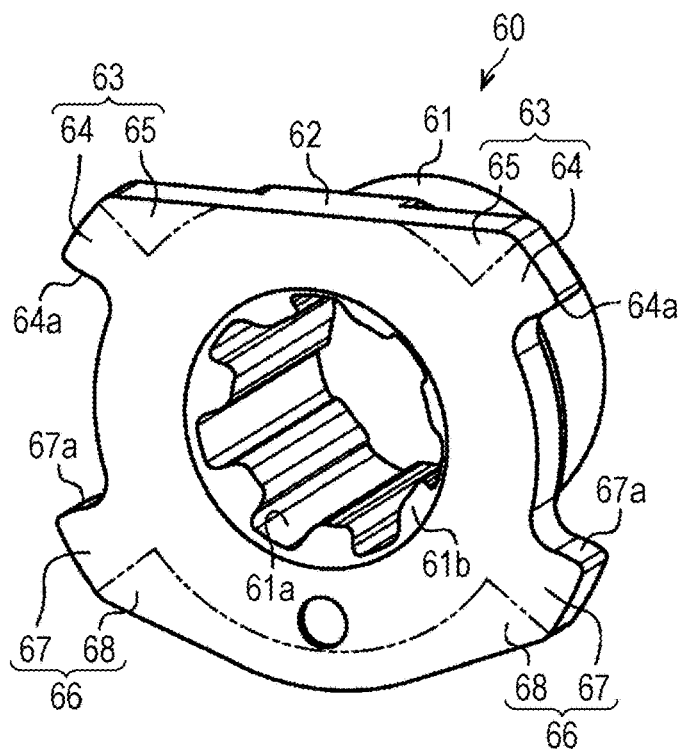
FIG. 7 is a perspective view of a striker.

As illustrated in FIG. 7, the striker 60 includes a cylindrical body portion 61 and a flange portion 62. The flange portion 62 is provided at an end portion of the body portion 61 in a direction along the second central axis C2. In the present embodiment, the body portion 61 and the flange portion 62 are integrally formed. In another example, the body portion 61 and the flange portion 62 are formed separately. In this case, the striker 60 is formed by connecting the flange portion 62 to the body portion 61.

As illustrated in FIG. 9, the body portion 61 is inserted into the cylindrical portion 24 of the outer tooth member 20 so as to be rotatable about the second central axis C2. The body portion 61 is provided with a through-hole 61a extending along the second central axis C2. The shaft 4 is inserted into the through-hole 61a. The through-hole 61a is provided with engaging teeth 61b that engage with the shaft 4. The flange portion 62 contacts an end surface 24c of the cylindrical portion 24 of the outer tooth member 20 (see FIG. 5).

The striker 60 further includes a pair of first pressing portions 63 that presses the protrusions 45 of the wedges 40. The pair of first pressing portions 63 is provided on the flange portion 62 so as to protrude in the radial direction with respect to the second central axis C2. The pair of first pressing portions 63 is arranged to overlap the pair of wedges 40 in a one-to-one relationship in the direction along the second central axis C2 (see FIG. 10). The pair of first pressing portions 63 is in sliding contact with the end surfaces 44 of the wedges 40. When the striker 60 rotates about the second central axis C2, the first pressing portions 63 press the protrusions 45 of the wedges 40 along a circumferential direction CD (see FIG. 8) of the second central axis C2.

Each of the pair of first pressing portions 63 has a pressing site 64 that presses the protrusion 45 and a movement restraining site 65. The pressing site 64 has a tip portion 64r and a root portion 64s. The base end portion 64s is connected to the flange portion 62 of the striker 60. The pressing site 64 is divided into the tip portion 64r and the root portion 64s by a line that bisects a length in the radial direction with respect to the second central axis C2. The pressing site 64 has a pressing surface 64a that presses the protrusion 45. The pressing surface 64a extends in the radial direction with respect to the second central axis C2 (see FIG. 8). The pressing site 64 has a predetermined width in the circumferential direction CD.

The movement restraining site 65 is provided on the opposite side of the pressing surface 64a in the pressing site 64, and restrains the wedge 40 from moving in the direction along the first central axis C1. The movement restraining site 65 is preferably formed such that at least a part of the movement restraining site 65 extends from the root portion 64s. It is preferable that a surface of the movement restraining site 65 facing the end surface 44 of the wedge 40 and a surface of the pressing site 64 facing the end surface 44 of the wedge 40 be flush with each other.

The striker 60 further includes a pair of second pressing portions 66 that presses the first end portions 42 of the wedges 40. Each of the second pressing portions 66 has a pressing site 67 that presses the first end portion 42 and a reinforcing site 68. The pressing site 67 has a tip portion 67r and a root portion 67s. The root portion 67s is connected to the flange portion 62 of the striker 60. The pressing site 67 is divided into the tip portion 67r and the root portion 67s by a line that bisects the length in the radial direction with respect to the second central axis C2. The pressing site 67 has a pressing surface 67a that presses the first end portion 42. The pressing surface 67a extends in the radial direction with respect to the second central axis C2 (see FIG. 8). The pressing site 67 has a predetermined width in the circumferential direction CD.

The reinforcing site 68 is provided on the opposite side of the pressing surface 67a in the pressing site 67 and reinforces the second pressing portion 66. The reinforcing site 68 is preferably formed such that at least a part of the reinforcing site 68 extends from the root portion 67s. The reinforcing sites 68 of the pair of second pressing portions 66 are formed to be connected to each other. As shown by a broken line in FIG. 8, the reinforcing sites 68 of the pair of second pressing portions 66 may be formed not to be connected to each other.

A relationship between the first pressing portion 63 and the second pressing portion 66 will be described with reference to FIGS. 8, 10 and 12. In the present embodiment, the first pressing portion 63 and the second pressing portion 66 are configured such that when the striker 60 is disposed in the reverse direction (second direction) with respect to the pair of wedges 40, the first pressing portion 63 operates as the second pressing portion 66, and the second pressing portion 66 operates as the first pressing portion 63. This point will be specifically described below.

As illustrated in FIG. 8, the striker 60 has a bilaterally symmetrical structure. The striker 60 has a symmetry line SL passing through the second central axis C2. The pair of first pressing portions 63 is arranged to be symmetrical with respect to the symmetry line SL. The pair of second pressing portions 66 is arranged to be symmetrical with respect to the line of symmetry SL. Further, the first pressing portion 63 and the second pressing portion 66, which are arranged on the same side with respect to the symmetry line SL, are configured such that the pressing surface 64a of the first pressing portion 63 and the pressing surface 67a of the second pressing portion 66 face each other.

Figure 10:
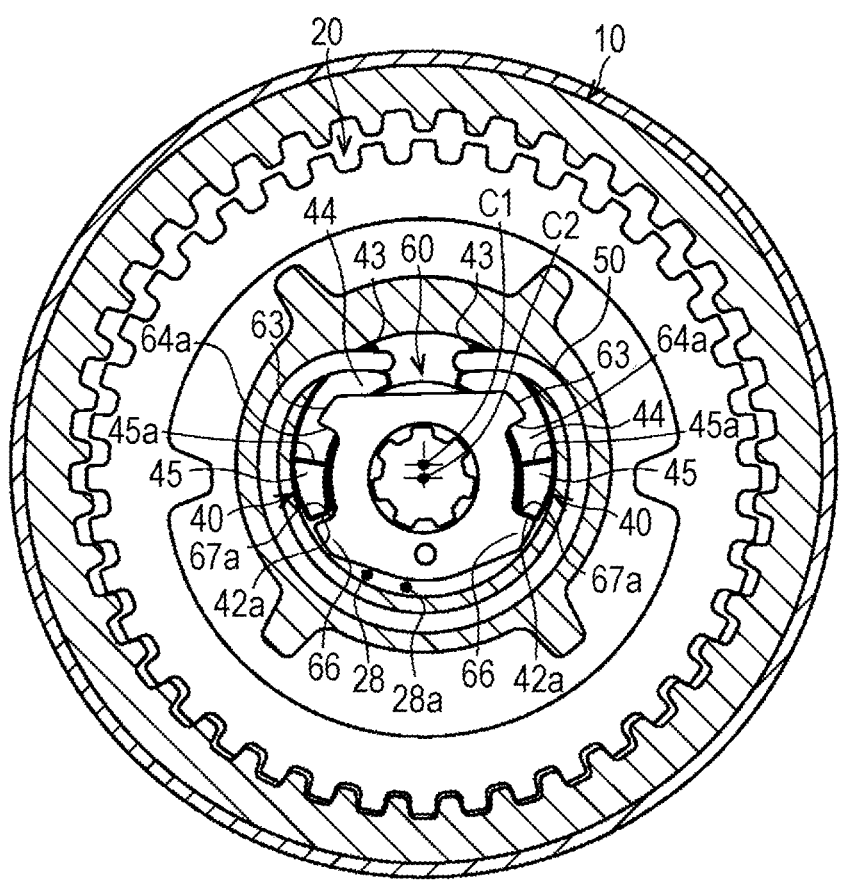
FIG. 10 is a first explanatory view for explaining an operation of the reclining apparatus.

As illustrated in FIG. 10, when the striker 60 is disposed in a predetermined direction (first direction), the pressing surface 64a of the first pressing portion 63 is located at a position facing the second pressed surface 45a of the protrusion 45 of the wedge 40, and the second pressing portion 66 is located at a position facing the first pressed surface 42a of the first end portion 42 of the wedge 40.

Figure 12:
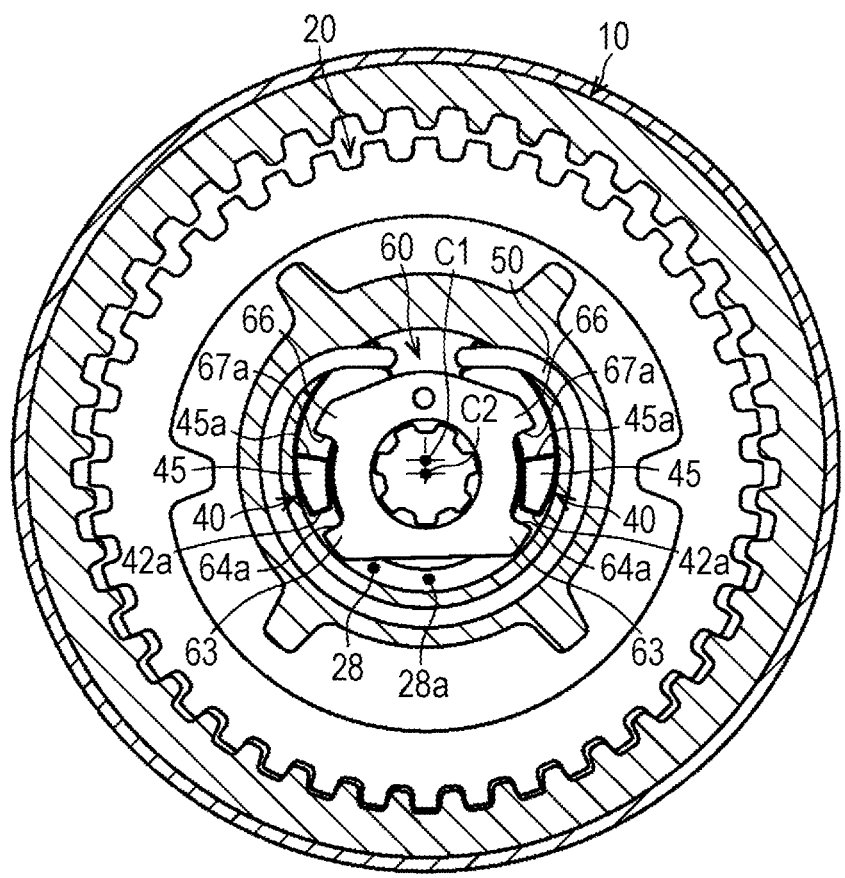
FIG. 12 is an explanatory view for explaining another arrangement of the striker.

As illustrated in FIG. 12, when the striker 60 is disposed in the reverse direction, the pressing surface 64a of the first pressing portion 63 is located at a position facing the first pressed surface 42a of the first end portion 42 of the wedge 40, and the second pressing portion 66 is located at a position facing the second pressed surface 45a of the protrusion 45 of the wedge 40. At this time, the pressing surface 64a of the first pressing portion 63 functions as the pressing surface 67a of the second pressing portion 66, and the pressing surface 67a of the second pressing portion 66 functions as the pressing surface 64a of the first pressing portion 63. The movement restraining site 65 functions as the reinforcing site 68, and the reinforcing site 68 functions as the movement restraining site 65. Thus, the striker 60 having a symmetrical structure allows the striker 60 to be used in both the predetermined direction (first direction) and the reverse direction (second direction). A first angle R1 between a line along the pressing surface 64a of the first pressing portion 63 and the symmetry line SL may be equal to or different from a second angle R2 between a line along the pressing surface 67a of the second pressing portion 66 and the symmetry line SL.

In the case of the present embodiment, the pressing surface 67a of the second pressing portion 66 is further configured such that the pressing surface 67a of the second pressing portion 66 when the striker 60 is disposed in the reverse direction (second direction) is located at a position different from a position of the pressing surface 64a of the first pressing portion 63 when the striker 60 is disposed in the predetermined direction (first direction). Hereinafter, this structure is referred to as a "left-right symmetrical vertically asymmetrical structure".

Specifically, the first angle R1 is different from the second angle R2. The first angle R1 is smaller than the second angle R2. In this case, when the striker 60 is disposed in the reverse direction, the pressing surface 64a of the first pressing portion 63 is located at a position different from the position of the pressing surface 67a of the second pressing portion 66 when the striker 60 is disposed in the predetermined direction (first direction). When the striker 60 is disposed in the reverse direction (second direction), the pressing surface 67a of the second pressing portion 66 is located at a position different from the position of the pressing surface 64a of the first pressing portion 63 when the striker 60 is disposed in the predetermined direction. Such a structure is effective in the following cases.

A position of the wedge 40 when disposed in the wedge accommodation space 28 varies in the circumferential direction about the first central axis C1 in each reclining apparatus 6 due to dimensional variation of the wedge 40. That is, in each reclining apparatus 6, an angle between the second pressed surfaces 45a of the pair of wedges 40 varies. Therefore, when the striker 60 is attached in the predetermined direction, a distance between the pressing surface 64a of the first pressing portion 63 and the second pressed surface 45a of the wedge 40 may be too small or too large.

In such a situation, the striker 60 is attached depending on the positions of the pair of wedges 40 as follows. When the angle between the second pressed surfaces 45a of the pair of wedges 40 is less than a predetermined angle, the striker 60 is attached to the outer tooth member 20 in the predetermined direction. On the other hand, when the angle between the second pressed surfaces 45a of the pair of wedges 40 is larger than the predetermined angle, the striker 60 is attached to the outer tooth member 20 in the reverse direction. This can restrain the distance between the pressing surface 64a of the first pressing portion 63 and the second pressed surface 45a of the wedge 40 from being too small or too large.

Further, the striker 60 preferably has the following structure in addition to the left-right symmetrical vertically asymmetrical structure. The movement restraining site 65 provided in the first pressing portion 63 is preferably configured to have a shape different from that of the reinforcing site 68 provided in the second pressing portion 66. Thus, the direction of the striker 60 can be easily specified based on the shape.

Figure 11:
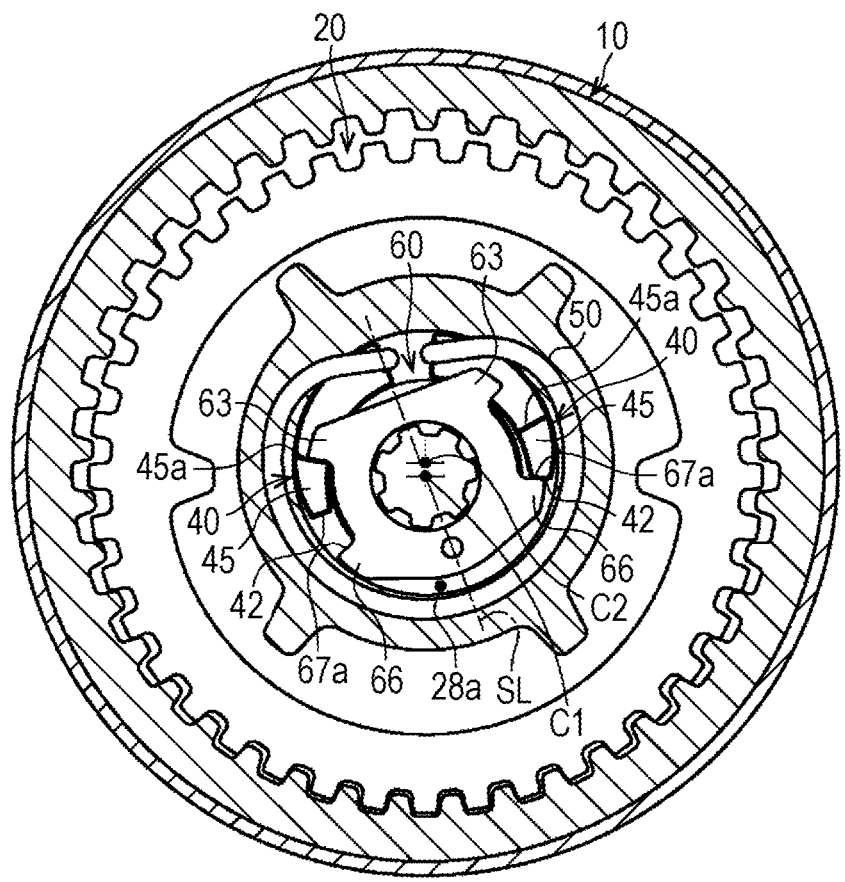
FIG. 11 is a second explanatory view for explaining the operation of the reclining apparatus.

An operation of the reclining apparatus 6 will be described with reference to FIGS. 9, 10 and 11. FIGS. 10 and 11 are views in which the urging member 50 is disposed in a cross-sectional view taken along a line 10-10 in FIG. 5.

When no torque is applied to the striker 60 by the motor, as illustrated in FIG. 10, the first pressing portion 63 does not press the protrusion 45 of the wedge 40, and the second pressing portion 66 does not press the first end portion 42 of the wedge 40. At this time, as illustrated in FIG. 9, each of the pair of wedges 40 is inserted into the narrowed portion 28a of the wedge accommodation space 28 by the urging force of the urging member 50. The outer tooth member 20 is fixed to the inner tooth member 10 by the pair of wedges 40 being inserted.

When the striker 60 is rotated by the power of the motor, as illustrated in FIG. 11, the second pressing portion 66 on one side of the symmetry line SL presses the first end 42 of the wedge 40 on the same side so as to be separated from the narrowed portion 28a. The first pressing portion 63 on the other side of the symmetry line SL presses the protrusion 45 of the wedge 40 on the same side toward the narrowed portion 28a. Then, the one wedge 40 and the other wedge 40 rotate about the first central axis C1 in the same direction as a rotation direction of the striker 60. The meshing portion 29 moves in the same direction as the striker 60 by rotation of the one wedge 40 and the other wedge 40. The outer tooth member 20 rotates in a direction opposite to the rotation direction of the striker 60 about the second central axis C2, and the outer tooth member 20 eccentrically moves about the first central axis C1 of the inner tooth member 10. By such rotation of the outer tooth member 20, the seat back 3 is tilted with respect to the seat cushion 2.

The operation of the present embodiment will be described.

The wedge 40 is pressed by the first pressing portion 63 of the striker 60, to rotate about the first central axis C1. The protrusion 45 of the wedge 40, which is pressed by the first pressing portion 63 of the striker 60, is provided to protrude in the direction along the first central axis C1 from the wedge body portion 41. Therefore, when the protrusion 45 of the wedge 40 is pressed by the first pressing portion 63 of the striker 60, a torque about a line in the radial direction with respect to the second central axis C2 (hereinafter referred to as a "torque about the radial direction") is applied to the wedge 40. Therefore, the second end portion 43 of the wedge 40 may be displaced in the direction along the second central axis C2, and the wedge 40 may swing.

In this respect, in the present embodiment, each of the pair of first pressing portions 63 of the striker 60 has the pressing site 64 and the movement restraining site 65. With this configuration, the protrusion 45 of the wedge 40 is pressed by the first pressing portion 63 of the striker 60, so that when the torque about the radial direction is applied to the wedge 40, the movement restraining site 65 presses the end surface 44 of the wedge 40. Therefore, the rotation of the wedge 40 based on the torque about the radial direction is restrained. Thus, the second end portion 43 of the wedge 40 is restrained from being displaced in the direction along the second central axis C2. Therefore, the wedge 40 moves smoothly. Further, even when the striker 60 is disposed in the reverse direction, the second pressing portion 66 functions as the first pressing portion 63 and the reinforcing site 68 functions as the movement restraining site 65. Thus, the same effect is obtained by the same operation as when the striker 60 is disposed in the predetermined direction.

The effect of the present embodiment will be described.

(1) In the reclining apparatus 6, each of the pair of wedges 40 has the wedge body portion 41 and the protrusion 45. The protrusion 45 protrudes along the first central axis C1 from the end surface 44 facing the direction along the first central axis C1. The striker 60 has the pair of first pressing portions 63 that press the protrusion 45. Each of the first pressing portions 63 has the pressing site 64 having the pressing surface 64a that presses the protrusion 45, and the movement restraining site 65. The movement restraining site 65 is provided on the opposite side of the pressing surface 64a in the pressing site 64, and restrains the wedge 40 from moving in the direction along the first central axis C1. With this configuration, the second end portion 43 of the wedge 40 is restrained from being displaced in the direction along the first central axis C1, so that the wedge 40 moves smoothly.

(2) In the first pressing portion 63, at least a part of the movement restraining site 65 is configured to extend from the root portion 64s. With this configuration, the root portion 64s of the pressing site 64 can be reinforced.

(3) The striker 60 has the pair of second pressing portions 66 that presses the first end portion 42 of the wedge 40. Each of the second pressing portions 66 has the pressing site 67 and the reinforcing site 68. The reinforcing site 68 is provided on the opposite side of the pressing surface 67a in the pressing site 67 and reinforces the second pressing portion 66. With this configuration, the second pressing portion 66 is reinforced by the reinforcing site 68. Thus, the second pressing portion 66 is restrained from being deformed.

(4) The reinforcing sites 68 of the pair of second pressing portions 66 are configured to be connected to each other. With this configuration, the reinforcing sites 68 are connected to each other, so that the strength of each reinforcing site 68 is increased. As a result, the second pressing portion 66 is restrained from being deformed.

(5) The first pressing portion 63 and the second pressing portion 66 are configured such that when the striker 60 is disposed in the reverse direction with respect to the pair of wedges 40, the first pressing portion 63 operates as the second pressing portion 66, and the second pressing portion 66 operates as the first pressing portion 63. With this configuration, the striker 60 can be disposed in the reverse direction in the wedge accommodating space 28. This allows the striker 60 to take two different directions in assembly. Therefore, the assembly efficiency is improved.

(6) The striker 60 is disposed in the first direction in which the pressing surface 64a of the first pressing portion 63 is located at a position facing the second pressed surface 45a of the protrusion 45 of the wedge 40. The pressing surface 67a of the second pressing portion 66 is configured such that the pressing surface 67a of the second pressing portion 66 when the striker 60 is disposed in the direction opposite to the first direction is located at the position different from the position of the pressing surface 64a of the first pressing portion 63 when the striker 60 is disposed in the first direction. Further, the movement restraining site 65 provided in the first pressing portion 63 is preferably formed in a shape different from that of the reinforcing site 68 provided in the second pressing portion 66.

(7) In the second pressing portion 66, at least a part of the reinforcing site 68 is configured to extend from the root portion 67s. With this configuration, the root portion 67s of the pressing site 67 can be reinforced.

Due to the dimensional tolerances of the inner tooth member 10, the outer tooth member 20, and the wedge 40, the position of the wedge 40 disposed in the wedge accommodation space 28 is different in each reclining apparatus 6. With the striker 60 having the above configuration, when the striker 60 is disposed in the reverse direction, the second pressing portion 66 is located at the position different from the position of the first pressing portion 63, and the second pressing portion 66 operates as the first pressing portion 63. In this way, by changing the direction of the striker 60 with respect to the position of the wedge 40, it is possible to adjust the distance between the protrusion 45 of the wedge 40 and the first pressing portion 63 of the striker 60. Since the distance can be adjusted in this way, the operation delay of the wedge 40 with respect to the operation of the striker 60 can be adjusted within the appropriate range.

Further, the movement restraining site 65 is formed in a shape different from that of the reinforcing site 68. Therefore, the direction of the striker 60 can be easily specified based on the shape. For example, when the striker 60 is assembled to the outer tooth member 20 by an assembling apparatus, a gripping mechanism for gripping the striker 60 in the assembling apparatus can be configured to specify the direction of the striker 60 based on the shape of the striker 60. With such an assembly apparatus, the striker 60 can be gripped in a predetermined direction.

OTHER EMBODIMENTS

The above embodiment is not limited to the above configuration example. The above embodiment can be modified as follows. In the following modifications, components that are substantially the same as the components of the above embodiment will be denoted by the same reference numerals as the components of the above embodiments.

The second circumferential surface 23 of the outer tooth member 20 is disposed to face the first circumferential surface 14 of the inner tooth member 10. In the above embodiment, as an example of this, the second circumferential surface 23 of the outer tooth member 20 is configured as the outer circumferential surface 24b of the cylindrical portion 24 provided in the base portion 21. Further, the first circumferential surface 14 of the inner tooth member 10 is configured as the inner circumferential surface of the circular through-hole 15 provided in the base portion 11. Then, the cylindrical portion 24 of the outer tooth member 20 is inserted into the through-hole 15 of the inner tooth member 10. Instead of this configuration, the second circumferential surface 23 of the outer tooth member 20 may be configured as the inner circumferential surface of the circular through-hole provided in the base portion 21. Further, the first circumferential surface 14 may be configured as the outer circumferential surface of the cylindrical portion provided on the base portion 11 of the inner tooth member 10. Furthermore, the inner tooth member 10 and the outer tooth member 20 may be configured such that the cylindrical portion of the inner tooth member 10 is inserted into the through-hole of the outer tooth member 20.

Figure 13:
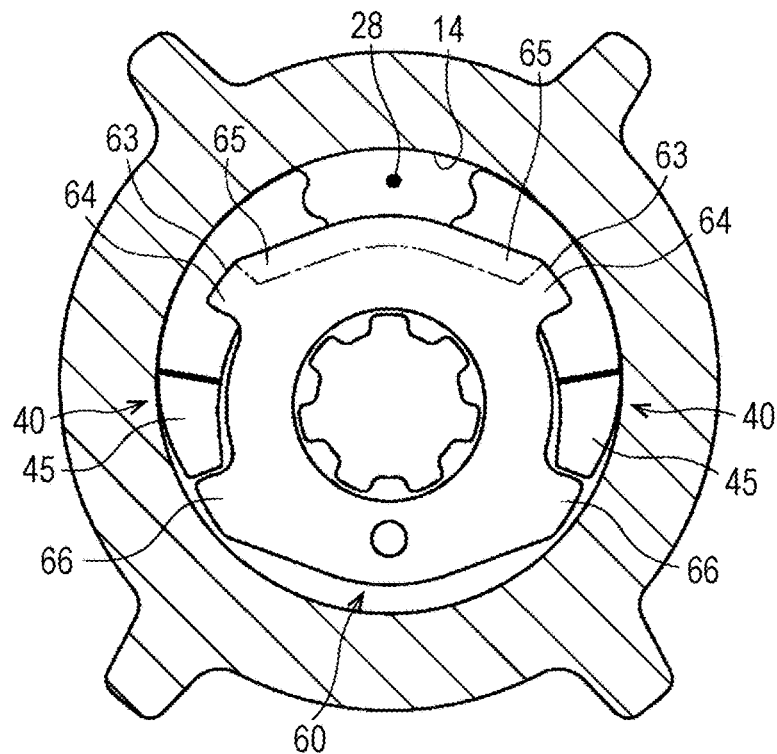
FIG. 13 is a plan view of a portion including the striker in a first modification of the reclining apparatus.

As illustrated in FIG. 13, the movement restraining sites 65 of the pair of first pressing portions 63 may be configured to be connected to each other.

With this configuration, the movement restraining sites 65 are connected to each other, so that the strength of each movement restraining site 65 is increased. As a result, the first pressing portion 63 is restrained from being deformed.

Figure 14:
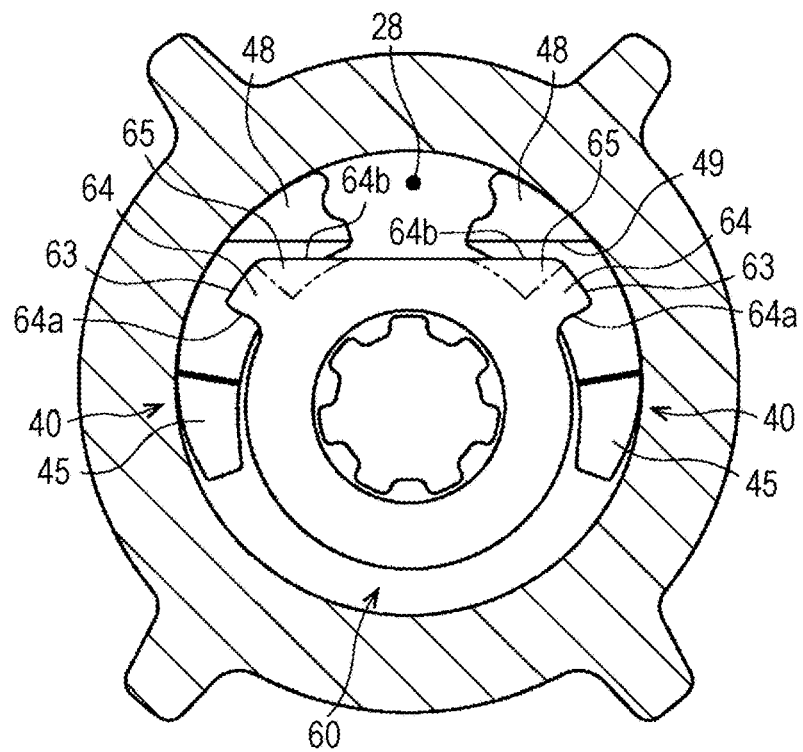
FIG. 14 is a plan view of the portion including the striker in a second modification of the reclining apparatus.

As illustrated in FIG. 14, in the striker 60, the pair of second pressing portions 66 may be omitted. In this case, in the first pressing portion 63, an additional pressing surface 64b is provided on the side opposite to the pressing surface 64a that presses the protrusion 45 of the wedge 40. The wedge 40 is provided with an additional protrusion 48, which is pressed by the pressing surface 64b, on the side of the second end portion 43. The additional protrusion 48 is provided with a pressed surface 49. When one first pressing portion 63 presses the protrusion 45 of one wedge 40, the other first pressing portion 63 presses the additional protrusion 48 of the other wedge 40. In this way, the striker 60 can rotate the pair of wedges 40 about the first central axis C1 in the same direction as the rotation direction of the striker 60.

In the present embodiment, the movement restraining site 65 of the first pressing portion 63 is provided on the opposite side of the pressing surface 64a in the pressing site 64 of the first pressing portion 63. Specifically, the movement restraining site 65 is configured to extend from the opposite side of the pressing surface 64a in the pressing site 64. The configuration of the movement restraining site 65 is not limited to such a configuration, and can have various modes.

Figure 15:
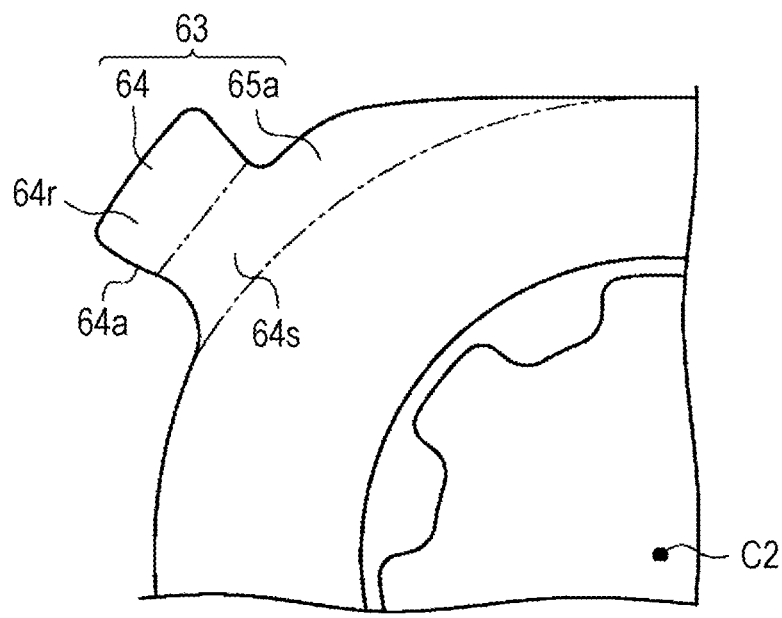
FIG. 15 is an enlarged view of a first modification of a movement restraining site provided in the striker.

In one example, as illustrated in FIG. 15, a movement restraining site 65a extends from the root portion 64s on the opposite side of the pressing surface 64a in the pressing site 64. When the length in the radial direction with respect to the second central axis C2 is defined as "height" with an outer edge line of the flange portion 62 as a reference height, the height of the movement restraining site 65a is lower than that of the pressing site 64.

In order to effectively restrain the second end portion 43 of the wedge 40 from being displaced in the direction along the second central axis C2, the movement restraining site 65a preferably overlaps the end surface 44 of the wedge 40 over a predetermined angle range around the second central axis C2. However, the movement restraining site 65a becomes large if the movement restraining site 65a is configured to overlap the entire end surface 44 of the wedge 40 over the predetermined angle range. In this regard, according to the configuration illustrated in FIG. 15, the movement restraining site 65a extends from the root portion 64s. Thus, the movement restraining site 65a can press the wedge 40 in the predetermined angle range. Further, the movement restraining site 65a is configured not to press a radially outer portion of the wedge 40. In the predetermined angle range, a circumferential length of the outer portion is longer than that of an inner portion of the wedge 40. Therefore, the movement restraining site 65a that does not press the outer portion is smaller than the movement restraining site that presses only the outer portion. As described above, with the above configuration, the striker 60 can be downsized while restraining the second end portion 43 of the wedge 40 from being displaced.

Figure 16:
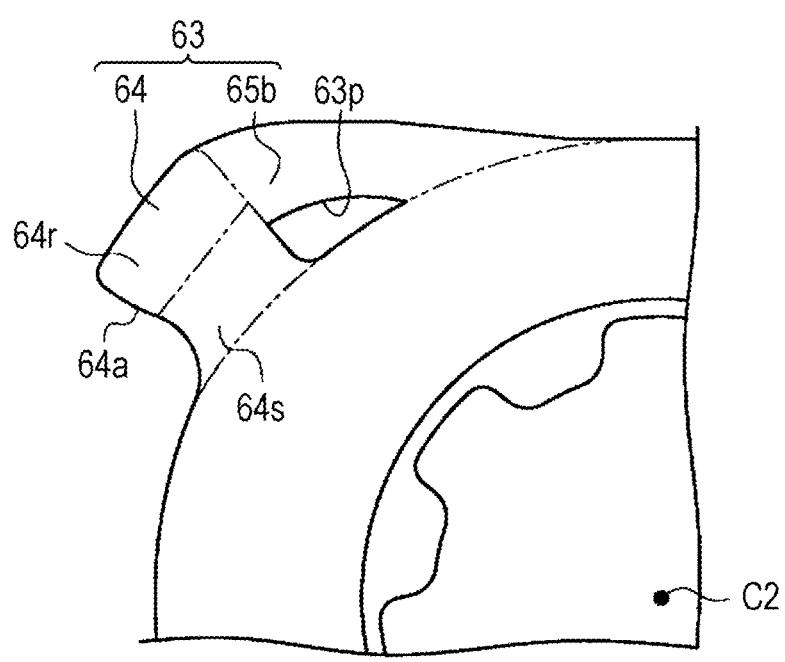
FIG. 16 is an enlarged view of a second modification of the movement restraining site provided in the striker.

In another example, as illustrated in FIG. 16, a movement restraining site 65*b* extends from the tip portion 64*r* and the root portion 64*s* on the opposite side of the pressing surface 64*a* in the pressing site 64. In this example, the first pressing portion 63 is provided with a through-hole 63*p*. The through-hole 63*p* is surrounded by the pressing site 64, the movement restraining site 65*b*, and the flange portion 62. With this configuration, the movement restraining site 65*b* can press a portion radially away from the flange portion 62. Further, the striker 60 can be reduced in weight.

A movement restraining site 65*c* of the first pressing portion 63 may be configured as follows. The pressing site 64 of the first pressing portion 63 has a connecting portion 64*t* connected to the flange portion 62 of the striker 60 (see FIG. 17). The connecting portion 64*t* is a portion including a boundary between the pressing site 64 and the flange portion 62. In this case, the movement restraining site 65*c* may be configured such that at least a part of the movement restraining site 65*c* extends from the connecting portion 64*t*. With this configuration, at least a part of the movement restraining site 65*c* can be separated from the pressing site 64. Therefore, the striker 60 can be reduced in weight.

Figure 17:
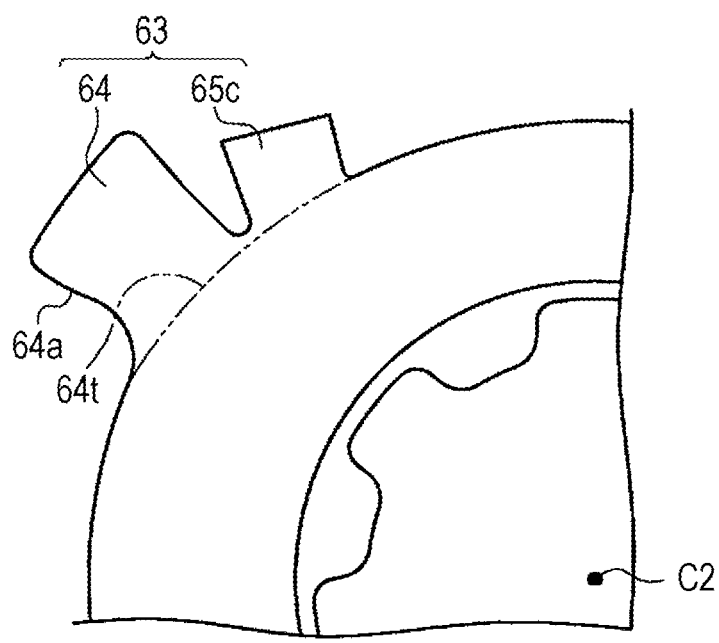
FIG. 17 is an enlarged view of a third modification of the movement restraining site provided in the striker.

For example, as illustrated in FIG. 17, the movement restraining site 65*c* protrudes from the vicinity of the connecting portion 64*t* on the opposite side of the pressing surface 64*a* in the pressing site 64 in a direction close to the radial direction with respect to the second central axis.

In the present embodiment, the reinforcing site 68 of the second pressing portion 66 is provided on the opposite side of the pressing surface 67*a* in the pressing site 67 of the second pressing portion 66. Specifically, the reinforcing site 68 is configured to extend from the opposite side of the pressing surface 67*a* in the pressing site 67. The configuration of the reinforcing site 68 is not limited to such a configuration, and can have various modes.

Figure 18:
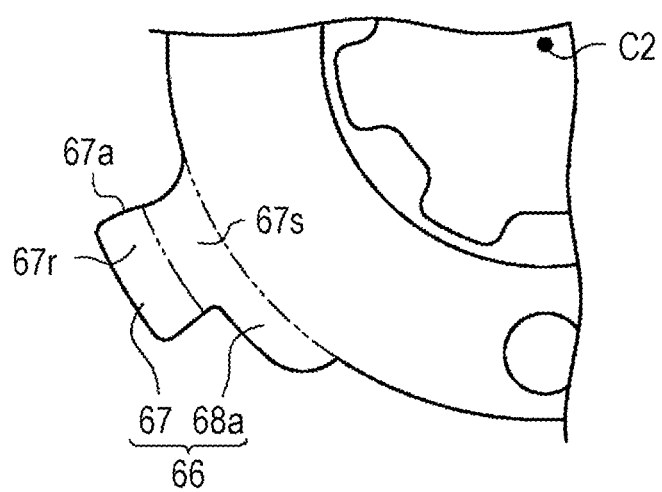
FIG. 18 is an enlarged view of a first modification of a reinforcing site provided in the striker.

In one example, as illustrated in FIG. 18, a reinforcing site 68*a* extends from the root portion 67*s* on the opposite side of the pressing surface 67*a* in the pressing site 67. When the length in the radial direction with respect to the second central axis C2 is defined as "height" with the outer edge line of the flange portion 62 as the reference height, the height of the reinforcing site 68*a* is lower than the height of the pressing site 67. With this configuration, the reinforcing site 68*a* can be made smaller by the same operation as the operation of the movement restraining site 65*a* shown in FIG. 15. As a result, the striker 60 can be downsized.

Figure 19:
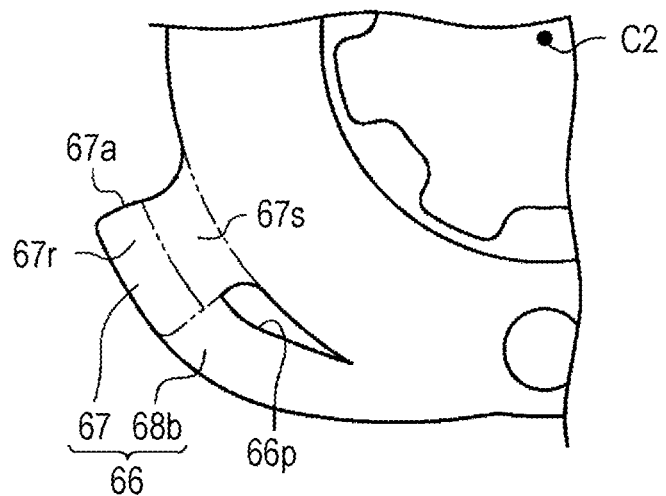
FIG. 19 is an enlarged view of a second modification of the reinforcing site provided in the striker.

In another example, as illustrated in FIG. 19, a reinforcing site 68*b* extends from the tip portion 67*r* and the root portion 67*s* on the opposite side of the pressing surface 67*a* in the pressing site 67. In this example, the second pressing portion 66 is provided with a through-hole 66*p*. The through-hole 66*p* is surrounded by the pressing site 67, the reinforcing site 68*b*, and the flange portion 62. With this configuration, the reinforcing site 68*b* can press the portion radially away from the flange portion 62. Further, the striker 60 can be reduced in weight.

A reinforcing site 68*c* of the second pressing portion 66 may be configured as follows.

The pressing site 67 of the second pressing portion 66 has a connecting portion 67*t* (see FIG. 20) connected to the flange portion 62 of the striker 60. The connecting portion 67*t* is a portion including a boundary between the pressing site 67 and the flange portion 62. In this case, the reinforcing site 68*c* may be configured such that at least a part of the reinforcing site 68*c* extends from the connecting portion 67*t*. With this configuration, at least a part of the reinforcing site 68*c* can be separated from the pressing site 67. Therefore, the striker 60 can be reduced in weight.

Figure 20:
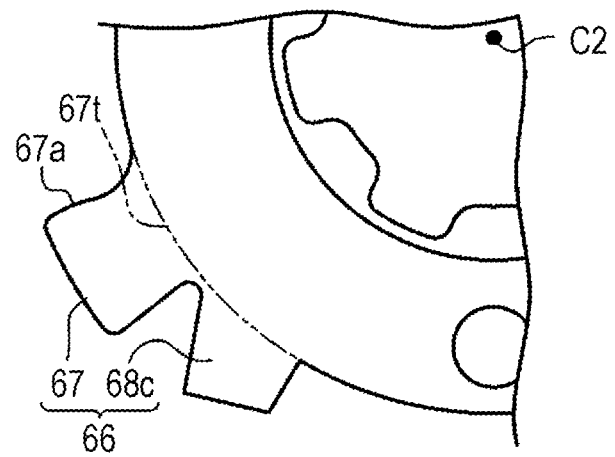
FIG. 20 is an enlarged view of a third modification of the reinforcing site provided in the striker.

For example, as illustrated in FIG. 20, the reinforcing site 68*c* protrudes from the vicinity of the connecting portion 67*t* on the opposite side of the pressing surface 67*a* in the pressing site 67 in the direction close to the radial direction with respect to the second central axis.

In the present embodiment, the inner tooth member 10 is attached to the seat cushion 2, and the outer tooth member 20 is attached to the seat back 3. In this case, when the striker 60 rotates, the outer tooth member 20 rotates in the direction opposite to the rotation direction of the striker 60. This rotation causes the seat back 3 to be tilted. In contrast, the outer tooth member 20 may be attached to the seat cushion 2, and the inner tooth member 10 may be attached to the seat back 3. In this case, when the striker 60 rotates, the inner tooth member 10 rotates in the same direction as the rotation direction of the striker 60. This rotation causes the seat back 3 to be tilted.

In the above embodiments, the shaft 4 is rotated by the motor. In this regard, a power source for rotating the shaft 4 is not limited to the motor. For example, the shaft 4 may be configured to be manually rotated. In this case, the shaft 4 is attached with a grip for hand rotation.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A reclining apparatus comprising:
   an inner tooth member including inner teeth arranged along an inner circumferential surface about a first central axis, and a first circumferential surface about the first central axis;
   an outer tooth member including outer teeth arranged along an outer circumferential surface about a second central axis, and a second circumferential surface configured to face the first circumferential surface about the second central axis;
   a pair of wedges arranged in a wedge accommodation space between the first circumferential surface and the second circumferential surface;
   an urging member that urges the pair of wedges toward a narrowed portion of the wedge accommodation space; and
   a striker that moves the pair of wedges, wherein
   each of the pair of wedges includes a wedge body, a first end portion provided at one end of the wedge body, a second end portion provided at an end opposite to the first end portion in the wedge body, and a protrusion protruding along the first central axis from an end surface facing a direction along the first central axis,
   the striker includes a pair of pressing portions that presses the protrusion, and
   each of the pressing portions includes a pressing site having a pressing surface that presses the protrusion, and a movement restraining site that is provided on an opposite side of the pressing surface in the pressing site and restrains the wedge from moving in the direction along the first central axis.

2. The reclining apparatus according to claim 1, wherein the movement restraining sites of the pair of pressing portions are configured to be connected to each other.

3. The reclining apparatus according to claim 1, wherein the pressing site of the pressing portion has a tip portion and a root portion, the root portion is connected to a flange portion of the striker, and the movement restraining site of the pressing portion is configured such that at least a part of the movement restraining site extends from the root portion.

4. The reclining apparatus according to claim 1, wherein the pressing site of the pressing portion has a connecting portion connected to a flange portion of the striker, and the movement restraining site is configured such that at least a part of the movement restraining site extends from the connecting portion.

5. The reclining apparatus according to claim 1, wherein the striker includes a first pressing portion that is the pressing portion, and further includes a pair of second pressing portions that presses the first end portion of the wedge, and each of the second pressing portions includes a pressing site having a pressing surface that presses the first end portion, and a reinforcing site that is provided on the opposite side of the pressing surface in the pressing site and reinforces the second pressing portion.

6. The reclining apparatus according to claim 5, wherein the reinforcing sites of the pair of second pressing portions are configured to be connected to each other.

7. The reclining apparatus according to claim 5, wherein when the striker is disposed in a reverse direction with respect to the pair of wedges, the first pressing portion and the second pressing portion are configured such that the first pressing portion operates as the second pressing portion and the second pressing portion operates as the first pressing portion.

8. The reclining apparatus according to claim 5, wherein the striker is disposed in a first direction in which the pressing surface of the first pressing portion is located at a position facing a second pressed surface of the protrusion of the wedge, the pressing surface of the second pressing portion is configured such that the pressing surface of the second pressing portion when the striker is disposed in a second direction opposite to the first direction is located at a position different from a position of the pressing surface of the first pressing portion when the striker is disposed in the first direction, and the movement restraining site provided in the first pressing portion is formed in a shape different from that of the reinforcing site provided in the second pressing portion.

9. The reclining apparatus according to claim 5, wherein the pressing site of the second pressing portion has a tip portion and a root portion, the root portion is connected to a flange portion of the striker, and the reinforcing site is configured such that at least a part of the reinforcing site extends from the root portion.

10. The reclining apparatus according to claim 5, wherein the pressing site of the second pressing portion has a connecting portion connected to a flange portion of the striker, and the reinforcing site is configured such that at least a part of the reinforcing site extends from the connecting portion.

* * * * *